United States Patent
Hirahara

(10) Patent No.: US 9,992,373 B2
(45) Date of Patent: Jun. 5, 2018

(54) INFORMATION PROCESSING APPARATUS AND METHOD FOR MONITORING AN OPERATING STATE OF A NETWORK DEVICE

(71) Applicant: CANON KABUSHIKI KAISHA, Tokyo (JP)

(72) Inventor: Akiko Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/452,461

(22) Filed: Mar. 7, 2017

(65) Prior Publication Data
US 2017/0264779 A1  Sep. 14, 2017

(30) Foreign Application Priority Data
Mar. 8, 2016 (JP) .................... 2016-044596

(51) Int. Cl.
G06F 3/12 (2006.01)
H04N 1/32 (2006.01)
H04N 1/00 (2006.01)

(52) U.S. Cl.
CPC ..... H04N 1/32539 (2013.01); H04N 1/00042 (2013.01); H04N 1/00061 (2013.01); H04N 1/00323 (2013.01); H04N 2201/0039 (2013.01); H04N 2201/0094 (2013.01)

(58) Field of Classification Search
None
See application file for complete search history.

(56) References Cited

U.S. PATENT DOCUMENTS

| | | | |
|---|---|---|---|
| 8,522,009 B2* | 8/2013 | Kawana | H04L 41/28 713/153 |
| 8,531,712 B2* | 9/2013 | Kawana | H04N 1/00344 358/1.13 |
| 2007/0294228 A1* | 12/2007 | Kawana | H04L 41/28 |
| 2008/0028060 A1* | 1/2008 | Fukasawa | G06F 21/608 709/223 |
| 2008/0062883 A1* | 3/2008 | Shima | G06F 11/006 370/241 |

FOREIGN PATENT DOCUMENTS

| JP | 2011-135552 A | 7/2011 |
|---|---|---|
| JP | 2012-63992 A | 3/2012 |

* cited by examiner

*Primary Examiner* — Henok A Shiferaw
(74) *Attorney, Agent, or Firm* — Canon U.S.A., Inc. IP Division

(57) ABSTRACT

A monitoring apparatus determines a monitoring mode of a network device which is not registered in a central management apparatus based on capability information of the relevant network device and registers the relevant network device in the central management apparatus. When monitoring information is not yet transmitted from a network device of which a monitoring function is enabled to the central management apparatus or invalid, the central management apparatus is requested to start communication with the relevant network device. Based on a result of the communication, a registration state, communication information, and device information of the relevant network device managed by the monitoring apparatus are updated.

8 Claims, 13 Drawing Sheets

DEVICE SEARCH RESULT SCREEN

SEARCH EXECUTION DATE AND TIME: 2015/11/25 13:10:25

| SELECT | SERIAL NO. | PRODUCT NAME | IPv4 ADDRESS | REGISTRATION STATE | DEVICE STATE |
|---|---|---|---|---|---|
| ☑ | /100123 | MFP 1200 | 10.1.0.101 | NOT REGISTERED | DURING PRINTING |
| ☑ | /100124 | LBP 634 | 10.1.0.102 | NOT REGISTERED | SLEEP |
| ☑ | /100125 | MFP 1210 | 10.1.0.105 | NOT REGISTERED | WARNING |
| ☑ | /100126 | MFP 1500 | 10.1.0.107 | NOT REGISTERED | ERROR |
| ☑ | /100127 | MFP 1500 | 10.1.0.112 | NOT REGISTERED | SLEEP |

1001

[SELECT ALL]  [REGISTER]          [CLOSE]

DEVICE DETAILED INFORMATION SCREEN

1100

| | |
|---|---|
| SERIAL NO. | DEV100127 |
| PRODUCT NAME | MFP1270 |
| IPv4 ADDRESS | 10.1.0.112 |
| MAC ADDRESS | 88:87:17:22:33:45 |
| REGISTRATION STATE | REGISTERED |
| DEVICE STATE | SLEEP |
| MONITORING FORM | FIRST CONNECTION MODE |

COMMUNICATION STATE WITH CENTRAL MANAGEMENT APPARATUS (LATEST THREE COMMUNICATIONS)

| COMMUNICATION TYPE | DATE AND TIME | DETAILS |
|---|---|---|
| SCHEDULE OBTAINMENT | 2015/11/25 13:20:30 | SUCCESSFUL |
| COMMUNICATION TEST | 2015/11/25 13:20:29 | SUCCESSFUL |

UPDATE INFORMATION 1101

CLOSE 1102

REGISTER IN CENTRAL MANAGEMENT APPARATUS (CONFIRM REGISTRATION CONTENTS)

1202 — ☑ THE DEVICE IS PREFERENTIALLY REGISTERED IN FIRST CONNECTION MODE

CENTRAL MANAGEMENT APPARATUS REGISTRATION INFORMATION — 1201

| | |
|---|---|
| CLIENT ID | XYZ1234567 |
| CLIENT NAME | *** CO., LTD. |
| CONTRACT NO. | 201511003456 ▼ |
| ADMINISTRATOR NAME | ○○×× ▼ |
| INVENTORY STORAGE LOCATION NAME | MAIL ROOM, 1ST FLOOR, MAIN BUILDING ▼ |

[OBTAIN INFORMATION] — 1203

REGISTRATION DEVICE

| SELECT | SERIAL NO. | PRODUCT NAME | IPv4 ADDRESS |
|---|---|---|---|
| 1205 → ☑ | DEV100123 | MFP 1200 | 10.1.0.101 |
| ☐ | SEV100124 | LBP 634 | 10.1.0.102 |
| ☐ | DEV100125 | MFP 1210 | 10.1.0.105 |
| ☐ | DEV100126 | MFP 1500 | 10.1.0.107 |
| ☐ | DEV100127 | MFP 1500 | 10.1.0.112 |

— 1204

[CHANGE REGISTRATION INFORMATION] — 1206    [DELETE DEVICE] — 1207    [REGISTER] — 1208    [CANCEL] — 1209

INFORMATION PROCESSING APPARATUS AND METHOD FOR MONITORING AN OPERATING STATE OF A NETWORK DEVICE

BACKGROUND

Field of the Disclosure

The present disclosure relates to a technique for monitoring an operating state of a network device.

Description of the Related Art

Conventionally, there are device management systems for remotely monitoring operating states of network devices such as printers and multifunction peripherals. In the device management systems, monitoring apparatuses installed on client sides and central management apparatuses are connected with each other via the Internet. The monitoring apparatuses collect network device information and transmit the collected network device information to the central management apparatuses using network protocols such as Hypertext Transfer Protocol Secure (HTTPS) and simple mail transfer protocol (SMTP). The central management apparatuses centrally control the network device information. The central management apparatuses centrally manage information of clients who concluded maintenance contracts, information of monitoring apparatuses, and the network device information, and when information is transmitted from the monitoring apparatus registered in the central management apparatus, the central management apparatuses store the transmitted information therein.

The monitoring apparatuses collect, from one or more network devices as monitoring targets, information such as operation information of the relevant network devices. On the other hand, there are network devices having monitoring functions similar to those of the monitoring apparatuses and of which the monitoring functions are enabled. The monitoring function includes a function of receiving and executing an instruction and a setting from the central management apparatus and a function of directly transmitting information similar to the one collected by the monitoring apparatus to the central management apparatus. Whether to use the monitoring apparatus or the network device of which the monitoring function is enabled is selected according to conditions such as a network environment of the client side and information to be collected.

Japanese Patent Application Laid-Open No. 2011-135552 describes a method that a network device of which a monitoring function is enabled changes a transmission destination of information not to a central management apparatus but to a monitoring apparatus. Japanese Patent Application Laid-Open No. 2012-63992 describes a method in which a network device changes, with respect to a request from a monitoring apparatus to change a transmission destination of monitoring information, the transmission destination of the monitoring information when not being monitored by another monitoring apparatus.

However, a client environment may include a network device of which the monitoring function is enabled and a network device of which the monitoring function is not enabled or which does not have the monitoring function in a mixed manner in some cases. Under such an environment, a service person needs to determine a monitoring mode settable for a network device based on a capacity of each model of the network device and individually perform initial installation including an initial setting on each network device by manual. Thus, the above-described conventional techniques have a risk of causing an erroneous operation in the initial installation when operations are started. Accordingly, there is a risk of, for example, omission of setting or redundant registration of the monitoring function with respect to the network device.

Thus, according to the conventional techniques, it is difficult to efficiently perform the initial installation of the network device at the start of operations under a client environment in which the network device of which the monitoring function is enabled and the network device of which the monitoring function is not enabled are mixed.

SUMMARY

According to an aspect of the present disclosure, an information processing apparatus communicable with a management apparatus managing a network device includes a memory storing instructions and a processor which can execute the instructions causing the information processing apparatus to obtain device information of a network device which is registered in the management apparatus, obtain capability information of a network device communicably connected to the information processing apparatus, determine whether a network device as a registration target is registered in the management apparatus based on the device information of the network device which is registered in the management apparatus, determine either of a first mode for transmitting operation information from a network device to the management apparatus without passing through the information processing apparatus and a second mode for transmitting operation information from a network device to the management apparatus via the information processing apparatus as a mode for monitoring a network device which is not registered in the management apparatus based on capability information of the relevant network device, instruct a network device which is not registered in the management apparatus to be registered in the management apparatus as a network device monitored in the determined mode, manage information of a network device monitored in the first mode, in a case that operation information of the network device monitored in the first mode is not transmitted from the relevant network device to the management apparatus, or information valid as the operation information of the relevant network device is not transmitted, request the management apparatus to start communication with the relevant network device, and update information of the relevant network device managed by the information processing apparatus based on a result of the requested communication.

Further features of the present disclosure will become apparent from the following description of exemplary embodiments with reference to the attached drawings.

BRIEF DESCRIPTION OF THE DRAWINGS

FIG. 10 illustrates a device search result screen according to one or more aspects of the present disclosure.

FIG. 11 illustrates a device detailed information screen according to one or more aspects of the present disclosure.

FIG. 12 illustrates a registration confirmation screen according to one or more aspects of the present disclosure.

DESCRIPTION OF THE EMBODIMENTS

Various exemplary embodiments of the present disclosure will be described below.

A first exemplary embodiment is described according to one or more aspects of the present disclosure.

Figure 1:
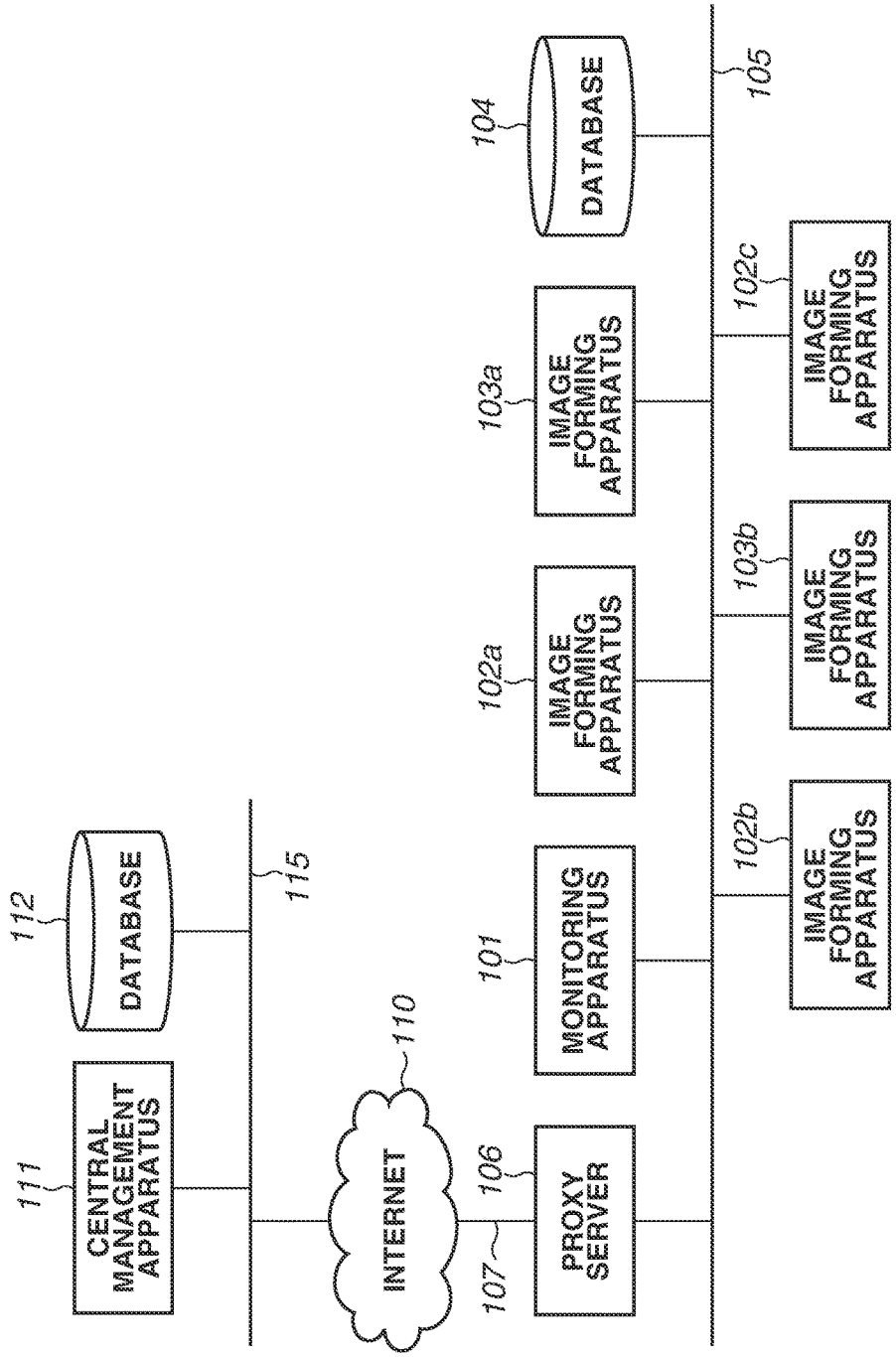
FIG. 1 illustrates a configuration of a device management system according to one or more aspects of the present disclosure.

FIG. 1 is a block diagram illustrating an example of an entire schematic configuration of a device management system.

In FIG. 1, a monitoring apparatus 101 is communicably connected to a plurality of image forming apparatuses 102*a* to 102*c*, 103*a*, and 103*b* as monitoring targets via a local area network (LAN) 105. The image forming apparatuses 102*a* to 102*c* are each a network device of which a monitoring function is enabled. On the other hand, the image forming apparatuses 103*a* and 103*b* are each a network device which does not have the monitoring function or a network device of which the monitoring function is not enabled. In the below description, the image forming apparatuses 102*a* to 102*c*, 103*a*, and 103*b* are referred to as the network devices if necessary. The image forming apparatuses 102*a* to 102*c* are the network devices of which the monitoring function is enabled, and the image forming apparatuses 103*a* and 103*b* are the network devices to be monitored by the monitoring apparatus if necessary. As described above, the monitoring function includes a function of receiving and executing an instruction and a setting from a central management apparatus 111 and a function of transmitting information similar to the one collected by the monitoring apparatus 101 to the central management apparatus 111. Further, the network device is, for example, a printer or a multifunction peripheral. The network device monitored by the monitoring apparatus is the network device which does not have the monitoring function or the network device of which the monitoring function is not enabled.

The monitoring apparatus 101 is connected to a database 104 via the LAN 105. The database 104 stores device information, monitoring information, and communication information of the network device and the like. The monitoring apparatus 101 obtains the monitoring information of the network device from the relevant network device or the central management apparatus 111. The monitoring information of the network device includes operation information of the relevant network device. The operation information of the network device includes, for example, various counter information pieces, log information, status information, and failure information of the network device. The log information includes, for example, information representing contents of an error and a warning occurred in the network device. The status information includes, for example, the failure information such as jam. In addition, the monitoring information of the network device includes registration information, consumable information, and capability information of the relevant network device and the like. The registration information of the network device includes, for example, information representing whether the relevant network device is registered in the central management apparatus 111 or not.

The device information of the network device is information for specifying the relevant network device. The device information of the network device includes, for example, a serial number (No.), a product name, an Internet Protocol version (IPv4) address, a media access control (MAC) address, and a device state of the relevant network device. The device state is a state of the network device (for example, a state during printing or sleep).

The communication information of the network device is set to the network device of which the monitoring function is enabled. The communication information of the network device includes, for example, a type, date and time, and details (result) of communication between the relevant network device and the central management apparatus 111.

In addition, the monitoring apparatus 101 collects charging information of the network device and stores the information in the database 104. The charging information of the network device includes an amount of money charged according to a use of the relevant network device.

When functions of the database 104 are included in the monitoring apparatus 101, the configuration of the database 104 may not be needed.

In the example illustrated in FIG. 1, the monitoring apparatus 101 is connected to an Internet line 107 via a proxy server 106. The monitoring apparatus 101 can communicate with a canter in a backend including the central management apparatus 111 via the Internet 110. When functions of the proxy server 106 are included in the monitoring apparatus 101, the configuration of the proxy server 106 may not be needed. FIG. 1 illustrates a system constituted of the monitoring apparatus 101, the network devices 102*a* to 102*c*, 103*a*, and 103*b*, the database 104, the LAN 105, and the proxy server 106. However, according to the present exemplary embodiment, a plurality of system can be constructed as the above-described system, and the central management apparatus 111 can manage the monitoring apparatuses 101 arranged in each of the systems.

The central management apparatus 111 receives, from a plurality of the monitoring apparatuses 101, the monitoring information pieces of the network devices (the registration information, the operation information, the consumable information, and the like) monitored by each of the monitoring apparatuses 101 and stores the monitoring information pieces in a database 112. The database 112 may physically exist in the central management apparatus 111. The central management apparatus 111 has functions of collecting, accumulating, and processing the monitoring information of the network device received from the monitoring apparatus 101 and providing tallying information, a warning, and the like for the outside. The tallying information is information tallying, for example, the monitoring information pieces of the network devices for each data item and for each network device. The central management apparatus 111 has a function of delivering the information pieces to, for example, a network device sales company.

The network device of which the monitoring function is enabled can directly transmit the monitoring information of the relevant network device to the central management apparatus 111. The monitoring apparatus 101 can monitor the network device of which the monitoring function is enabled. On the other hand, the network device monitored by the monitoring apparatus cannot directly transmit the monitoring information of the relevant network device to the central management apparatus 111 and is monitored from the monitoring apparatus 101.

With an instruction by a user interface (UI) or an instruction from the central management apparatus 111 as a trigger, the monitoring apparatus 101 receives a registration instruction of the network device as the monitoring target. The monitoring apparatus 101 performs registration processing of the network device based on the registration instruction and then starts monitoring processing of the network device. An example of the processing is described in detail below with reference to flowcharts in FIGS. 7 and 13. Monitoring of the network device of which the monitoring function is enabled is started by the relevant monitoring function is started by an instruction from a local UI, a remote UI, or an external apparatus. The local UI is a UI installed in the network device. The remote UI is a UI configured to enable browsing and setting of the network device from the outside.

Figure 2:
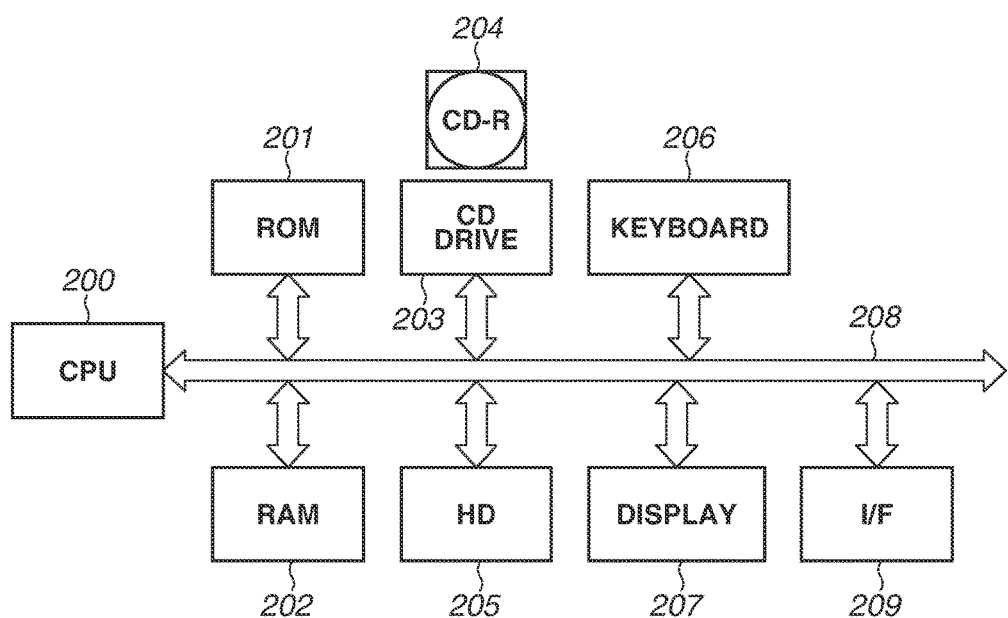
FIG. 2 illustrates a hardware configuration of an information processing apparatus according to one or more aspects of the present disclosure.

FIG. 2 is a block diagram illustrating an example of a hardware configuration of an information processing apparatus. Hardware of the monitoring apparatus 101 and the central management apparatus 111 illustrated in FIG. 1 and the information processing apparatus installed in the backend not illustrated can be realized by, for example, the configuration illustrated in FIG. 2.

In FIG. 2, a central processing unit (CPU) 200 executes an application program stored in a hard disk (HD) 205, various driver programs, an operating system (OS), a program for realizing processing described below, and the like. When executing these programs, the CPU 200 performs control to temporarily store information, a file, and the like necessary for the execution of the relevant program in a random access memory (RAM) 202.

A read-only memory (ROM) 201 stores a program such as a basic input/output (I/O) program, a program for controlling each processing of the information processing apparatus, and various data pieces. The RAM 202 functions as a main memory and a work area of the CPU 200.

A program and the like stored in a compact disk readable (CD-R) 204 as a storage medium can be loaded via to a compact disk (CD) drive 203 to the present computer system. The storage medium is not limited to the CD-R 204 and may optionally include a digital versatile disk (DVD), an integrated circuit (IC) memory card, and the like. The storage medium stores a computer-readable program and the like.

The HD 205 functions as a high-capacity memory. The HD 205 stores a boot program, an application program, various driver programs, an OS, various control programs, related programs, and the like.

A keyboard 206 is used by a user to input a control instruction, a setting, and the like to the information processing apparatus.

A display 207 displays information based on the control instruction input from the keyboard 206, a state of the information processing apparatus, and the like. For example, a drawing command issued by an application program via a mechanism of the OS is interpret by a graphic card, and information converted into an analog signal or a digital signal is displayed on the display 207. Display control according to the present exemplary embodiment includes processing for generating a drawing command via the OS to perform display on the display 207.

A system bus 208 controls a data flow in the information processing apparatus. An interface (I/F) 209 is used for exchanging data between the information processing apparatus and the external apparatus.

Figure 3:
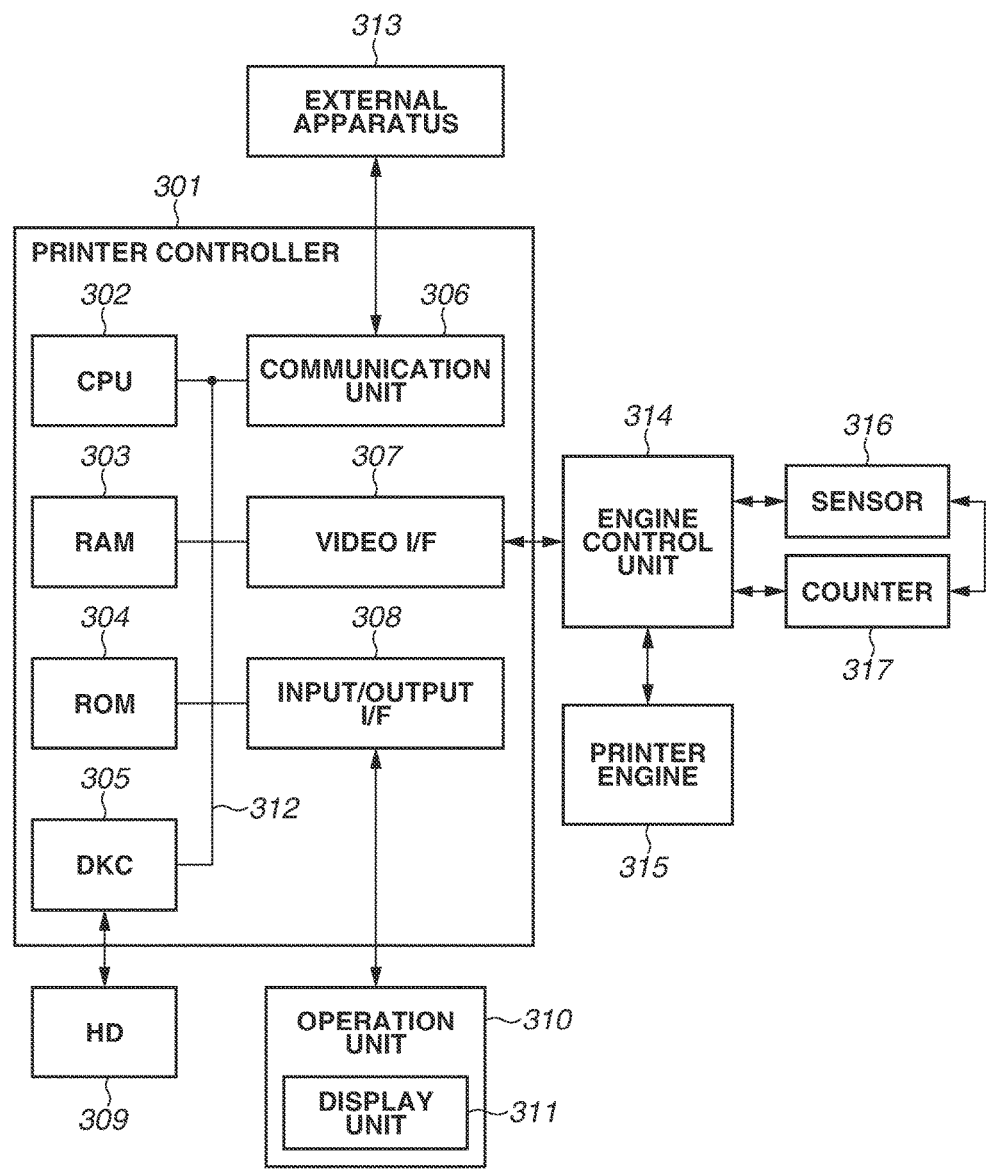
FIG. 3 illustrates a hardware configuration of a network device according to one or more aspects of the present disclosure.

FIG. 3 is a block diagram illustrating an example of a hardware configuration a printer controller and peripherals of the network device.

A printer controller 301 includes a communication unit 306 for executing transmission and reception of various data pieces to and from an external apparatus 313 such as the monitoring apparatus 101 by a predetermined communication protocol. A video I/F 307 receives image data, develops the received image data to information printable by a printer, and also performs exchange of signals and serial communication with an engine control unit 314.

A CPU 302 comprehensively controls accesses to and from various devices connected to a system bus 312 based on a control program and the like stored in a ROM 304 or a HD 309. Further, the CPU 302 outputs an image signal as output information to the engine control unit 314 connected via the video I/F 307.

A RAM 303 functions as a main memory and a work area of the CPU 302.

The HD 309 stores a boot program, various application programs, font data, a user file, an edit file, and the like. A memory controller (DKC) 305 controls accesses to and from the HD 309. Regarding the network device of which the monitoring function is enabled, a program for realizing the monitoring function is stored in the HD 309 and the like.

An operation unit 310 which includes a display unit (display panel) 311 and a keyboard is used for providing information to an operator and receiving an instruction input from the operator via an input/output I/F 308.

The engine control unit 314 performs exchange of signals with the printer controller 301 and control of each unit such as a printer engine 315, a sensor 316, and a counter 317 via the serial communication. The engine control unit 314 may include the CPU. The printer engine 315 is an engine unit for forming an image on a recording medium such as paper. The sensor 316 detects failure, jam, and the like. The counter 317 updates a count value with a completion of a printer job and the like as a trigger.

Figure 4:
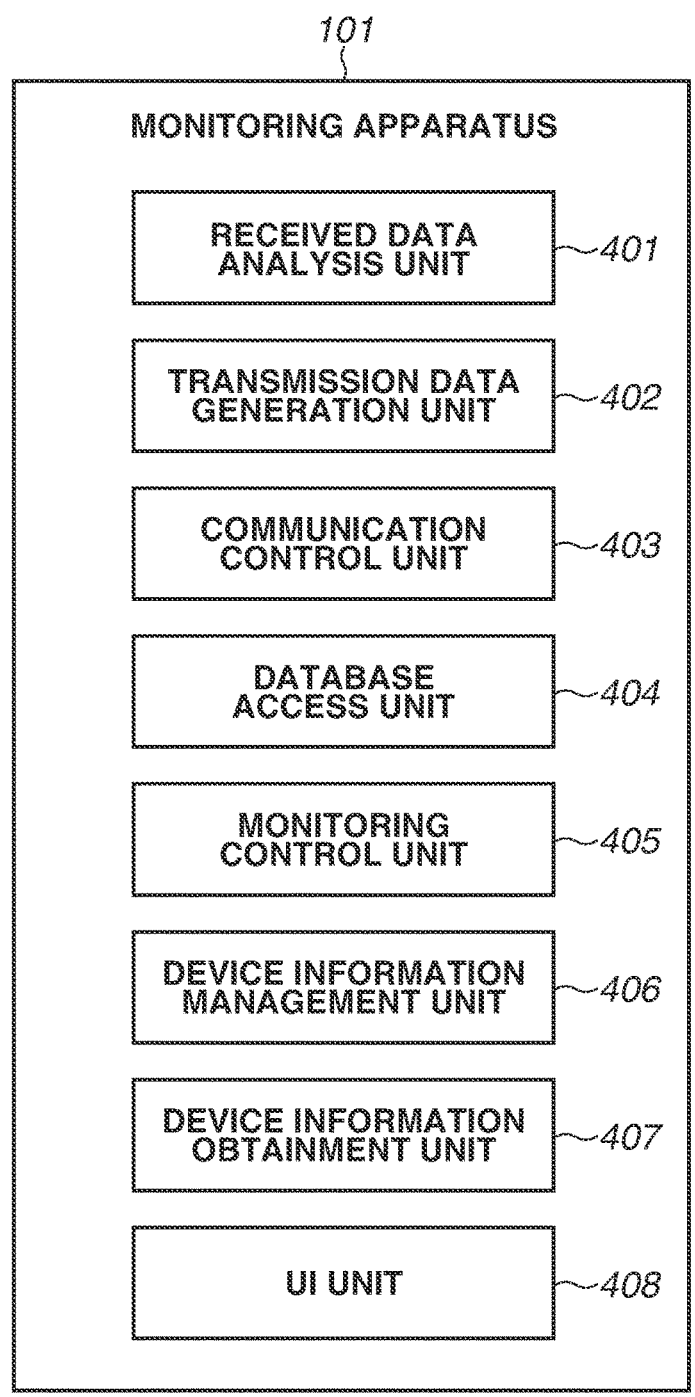
FIG. 4 illustrates a software configuration of a monitoring apparatus according to one or more aspects of the present disclosure.

FIG. 4 is a block diagram illustrating an example of a software configuration of the monitoring apparatus 101.

A received data analysis unit 401 analyzes data received from the central management apparatus 111 and the network device via a communication control unit 403 and transmits the received data to an appropriate processing unit.

A transmission data generation unit 402 generates transmission data corresponding to the communication protocol in response to a request from each processing unit. The transmission data generated by the transmission data generation unit 402 is transmitted to the central management apparatus 111 and the external apparatus such as the network device via the communication control unit 403. As illustrated in FIG. 1, when a relay server such as the proxy server 106 is specified in a network setting of the monitoring apparatus 101, the transmission data is finally transmitted to the central management apparatus 111 via the relay server. The same can be applied to the apparatuses other than the monitoring apparatus 101.

The communication control unit 403 controls transmission and reception of data performed by the central management apparatus 111 and the external apparatus such as the network device via the LAN 105 and the Internet line 107 using the I/F 209.

A database access unit 404 performs input and output of data to and from the database 104 using the I/F 209. When data pieces such as the monitoring information and the setting information of the network device are stored in a storage device built in the monitoring apparatus 101, the database access unit 404 performs input and output of the data to and from the storage device.

A monitoring control unit 405 performs instruction and control to the network device and various processing on the central management apparatus 111 based on information obtained from a device information management unit 406. The monitoring control unit 405 receives, from the central management apparatus 111, a communication schedule for monitoring the network device, the monitoring information and the charging information of the network device, a processing instruction, and the like. The monitoring control unit 405 performs monitoring control corresponding to the received information.

The device information management unit 406 manages the information of the network device registered in the central management apparatus 111 and the monitoring information obtained from the network device. Various information pieces are stored in the database 104 via the database access unit 404.

A device information obtainment unit 407 obtains various information pieces regarding the network device such as the monitoring information of the network device managed by itself from the central management apparatus 111 or the network device.

The monitoring information of the network device is processed by the transmission data generation unit 402 to the transmission data and transmitted by the communication control unit 403 to the central management apparatus 111.

A UI unit 408 uses the display 207 to display information regarding the network device, an operation screen, and the like. A user of the monitoring apparatus 101 can perform various inputs according to the display by the UI unit 408 by using the keyboard 206. The UI unit 408 is a user interface of a program executed according to the flowcharts in FIGS. 7 and 13 described below.

Figure 5:
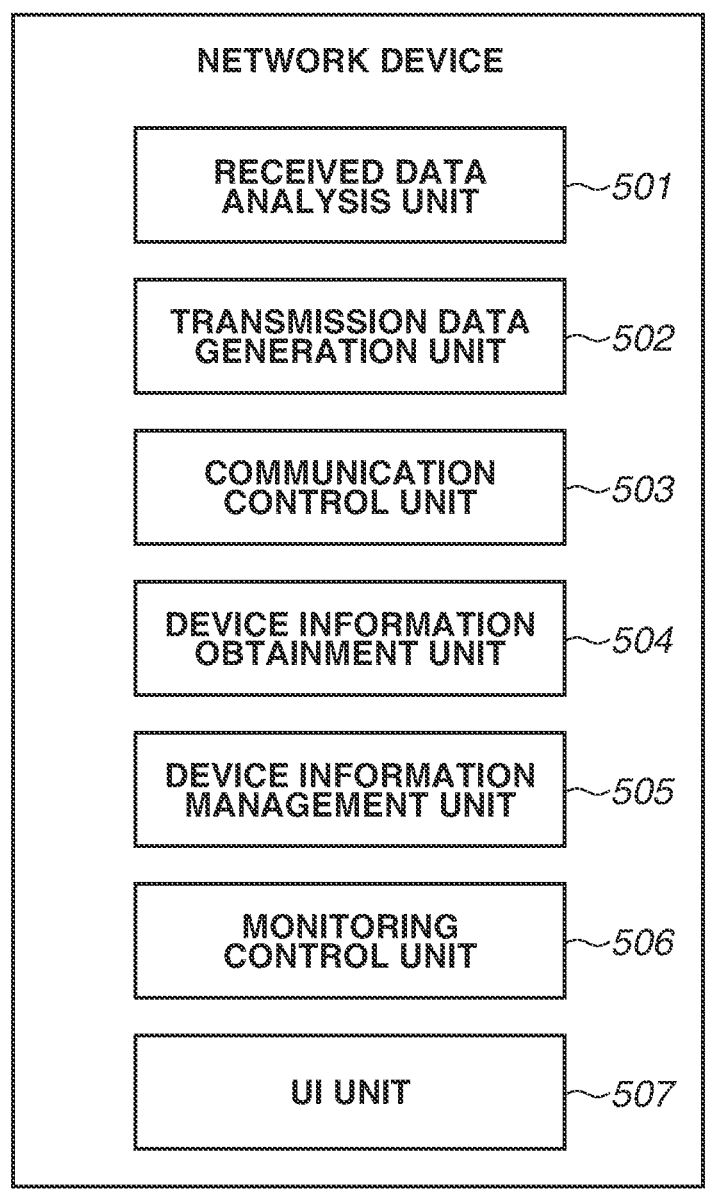
FIG. 5 illustrates a software configuration of the network device.

FIG. 5 is a block diagram illustrating an example of a software configuration of the network device.

A received data analysis unit 501 analyzes data received from the monitoring apparatus 101 via a communication control unit 503 and transmits the received data to an appropriate processing unit.

A transmission data generation unit 502 generates transmission data corresponding to the communication protocol in response to a request from each processing unit. The transmission data generated by the transmission data generation unit 502 is transmitted to the monitoring apparatus 101 and the external apparatus such as the central management apparatus 111 via the communication control unit 503.

The communication control unit 503 controls transmission and reception of data performed by the external apparatus such as the monitoring apparatus 101 via the LAN 105 and the Internet line 107 using the communication unit 306

A device information obtainment unit 504 obtains the operation information of the network device. As described above, the operation information of the network device includes various counter information pieces, the log information, the status information, and the failure information.

Further, the device information obtainment unit 504 obtains the capability information and the consumable information of the network device and the like by an instruction from the monitoring apparatus 101. The thus obtained data is processed by the transmission data generation unit 502 to the transmission data and transmitted by the communication control unit 503 to a request source/a transmission destination such as the monitoring apparatus 101.

A device information management unit 505 manages and controls the information obtained by the device information obtainment unit 504 as the monitoring information of the network device.

When the monitoring function in the network device is enabled by an instruction from the local UI, the remote UI, or the external apparatus, a monitoring control unit 506 performs monitoring similar to that of the monitoring apparatus 101 within the device. In the network device of which the monitoring function is enabled, the monitoring control unit 506 is enabled. On the other hand, the network device monitored by the monitoring apparatus does not have the monitoring control unit 506, or the monitoring control unit 506 thereof is disabled.

The monitoring control unit 506 collects the monitoring information of the network device by the device information obtainment unit 504 according to the communication schedule for monitoring the network device obtained from the central management apparatus 111. The monitoring information of the network device is managed in the device information management unit 505. The monitoring information of the network device is processed by the transmission data generation unit 502 to the transmission data according to the communication schedule for monitoring the relevant network device and transmitted to the central management apparatus 111 by the communication control unit 503. In the below description, a monitoring mode in which the network device of which the monitoring function is enabled directly transmits the monitoring information of the relevant network device to the central management apparatus 111 is referred to as a first connection mode if necessary. Further, a monitoring mode in which the monitoring apparatus 101 collects the monitoring information of the network device monitored by the monitoring apparatus and transmits the monitoring information to the central management apparatus 111 is referred to as a second connection mode if necessary.

A UI unit 507 uses the display unit 311 of the network device to display various information pieces and uses the operation unit 310 to set a value input by a user according to the display of the various information pieces. The UI unit 507 corresponds to the local UI of the network device.

Figure 6:
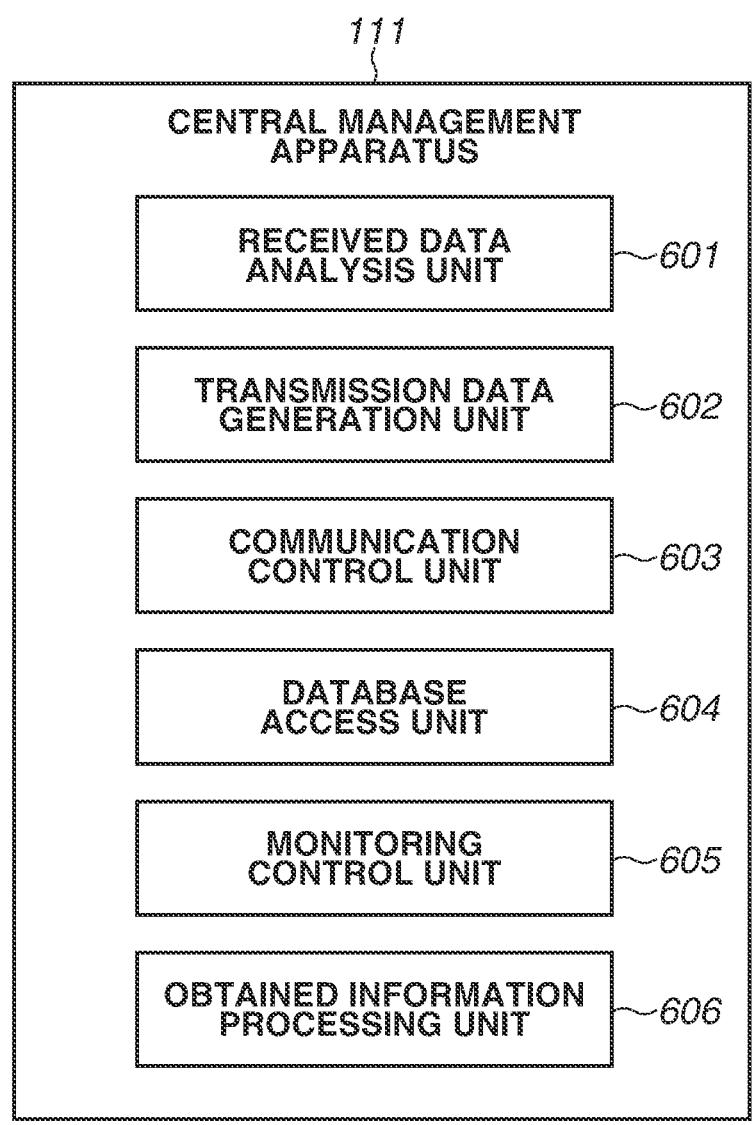
FIG. 6 illustrates a software configuration of a central management apparatus according to one or more aspects of the present disclosure.

FIG. 6 is a block diagram illustrating an example of a software configuration of the central management apparatus 111.

A received data analysis unit 601 analyzes data received from the monitoring apparatus 101 and the image forming apparatus of which the monitoring function is enabled via a communication control unit 603 and transmits the received data to an appropriate processing unit.

A transmission data generation unit 602 generates transmission data corresponding to the communication protocol in response to a request from each processing unit. The transmission data generated by the transmission data generation unit 602 is transmitted to the monitoring apparatus 101 and the image forming apparatuses 102a to 102c each of which the monitoring function is enabled via the communication control unit 603.

The communication control unit 603 controls transmission and reception of data performed by the monitoring apparatus 101 and the external apparatuses such as the image forming apparatuses 102a to 102c each of which the monitoring function is enabled via the LAN 105 and the Internet line 107 using the I/F 209.

A database access unit 604 performs input and output of data to and from the database 112 using the I/F 209.

A monitoring control unit 605 manages a schedule for obtaining the monitoring information and the charging information of the network device and the like from the monitoring apparatus 101 and controls a monitoring content and a monitoring method of the monitoring apparatus 101 and the network device of which the monitoring function is enabled. Further, the monitoring control unit 605 transmits an instruction and a response to the monitoring apparatus 101 under the control of itself via the transmission data generation unit 602 and the communication control unit 603 if necessary.

An obtained information processing unit 606 stores the information received from the monitoring apparatus 101 under the control of itself as it is or after processing in the database 112 via the database access unit 604. The obtained information processing unit 606 also performs processing based on the information received from the monitoring apparatus 101 and the external apparatuses such as the image forming apparatuses 102a to 102c each of which the monitoring function is enabled and the information stored in the database 112. Such processing includes, for example, tallying of the counter information and processing for notifying a service person in charge and a client side of error information including a pseudo alarm.

Figure 7:
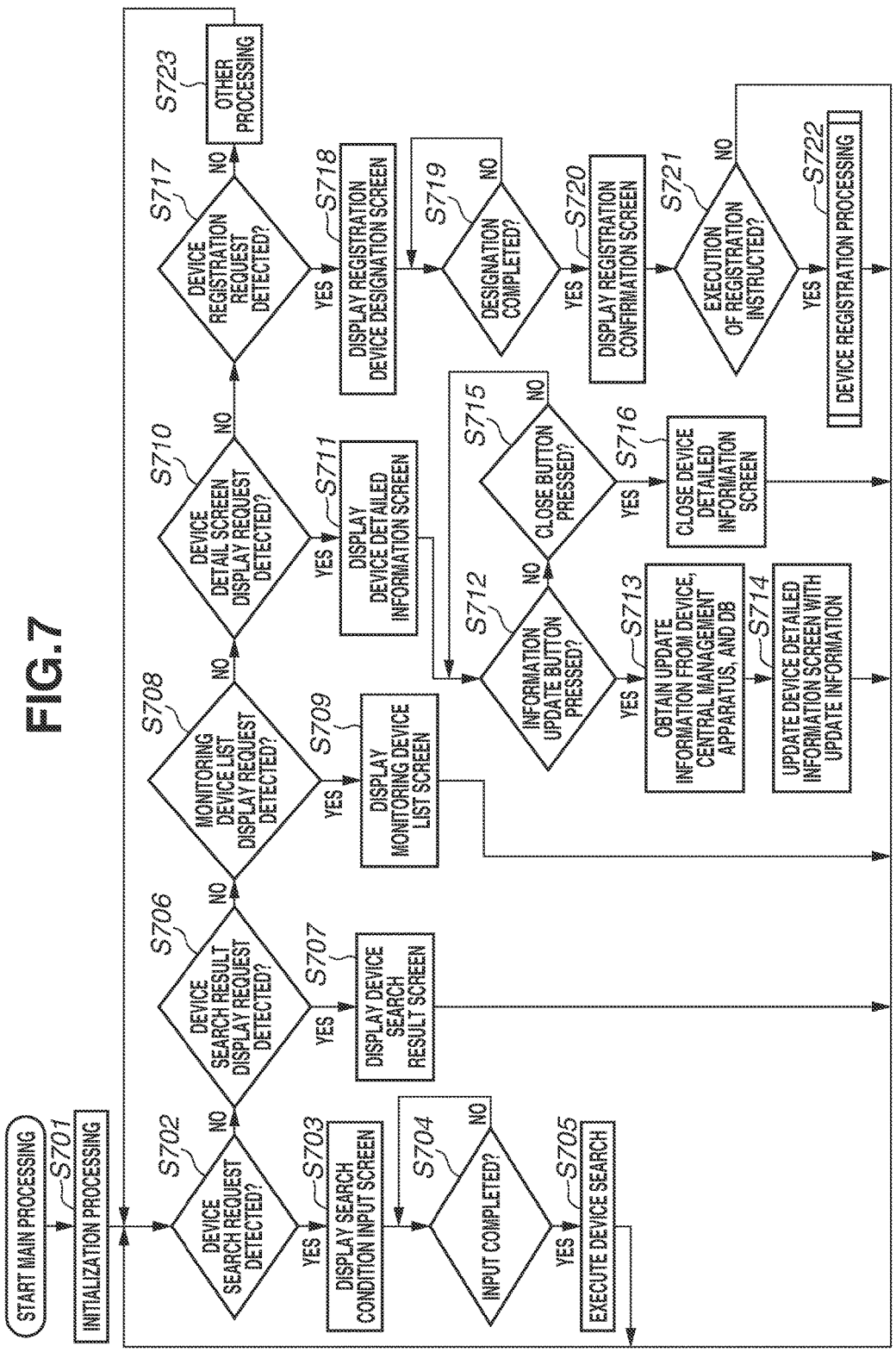
FIG. 7 is a flowchart illustrating an example of processing of the monitoring apparatus according to one or more aspects of the present disclosure.

FIG. 7 is a flowchart illustrating an example of processing of the monitoring apparatus 101. The processing in each step of the flowchart in FIG. 7 is realized by, for example, the CPU 200 of the monitoring apparatus 101 executing processing based on a program code stored in the storage unit such as the ROM 201 and the HD 205.

Figure 8:
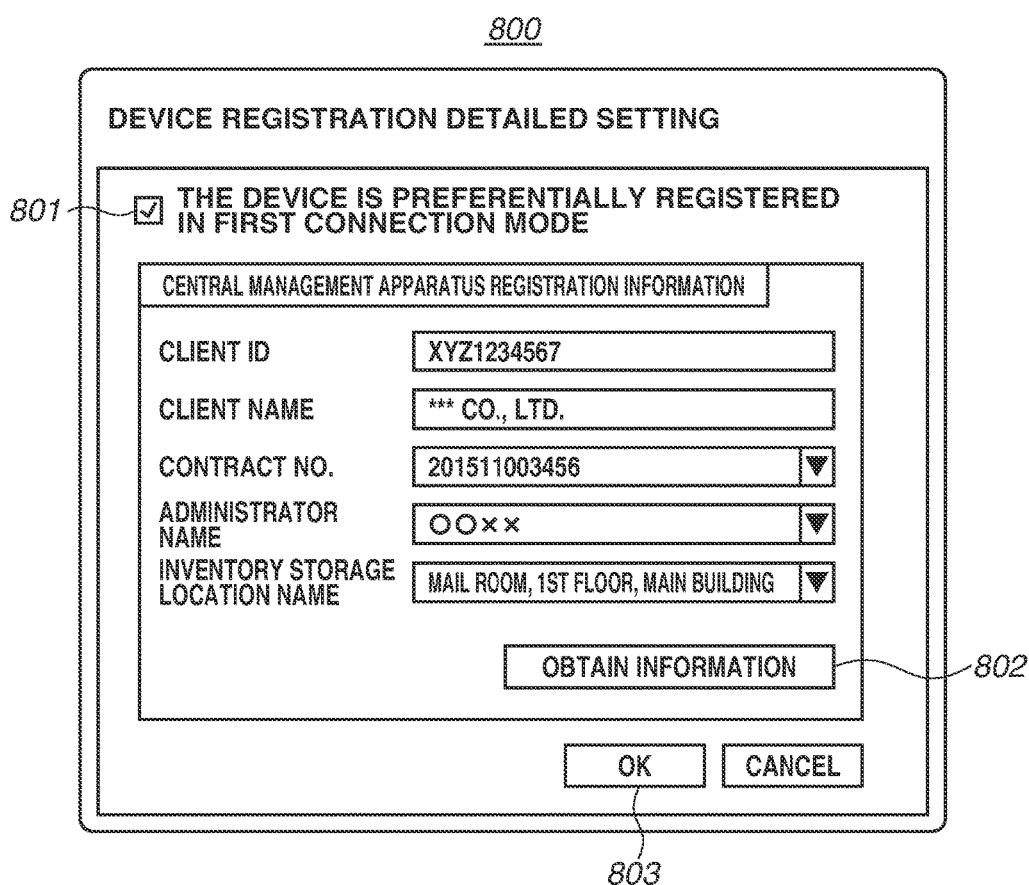
FIG. 8 illustrates a device registration detailed setting screen according to one or more aspects of the present disclosure.
Figure 9:
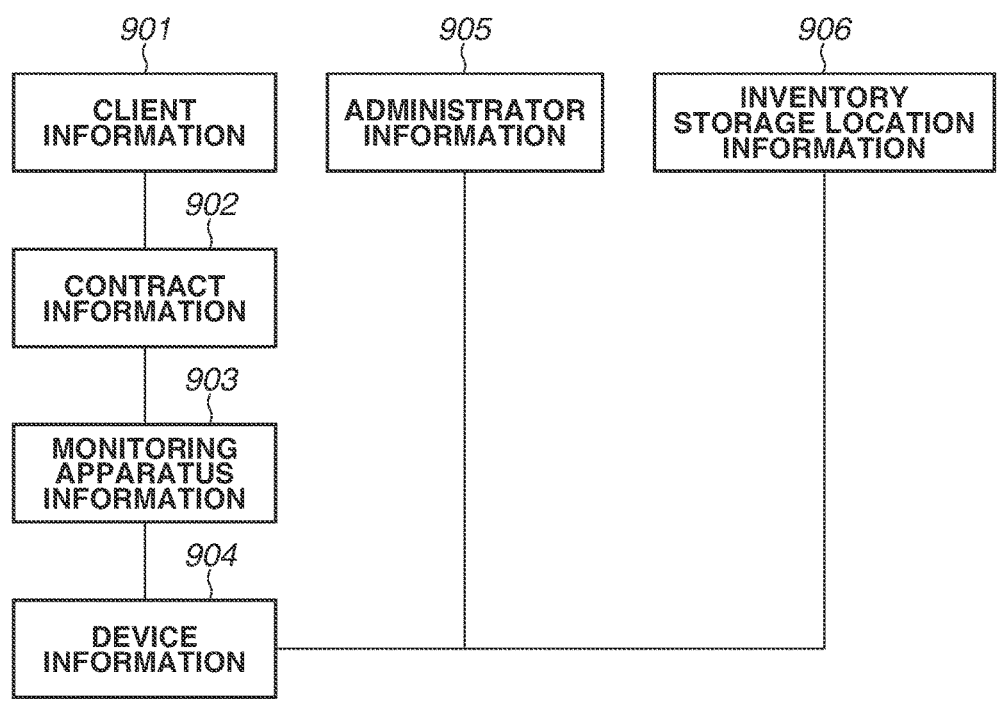
FIG. 9 illustrates a relationship of information pieces registered in the central management apparatus according to one or more aspects of the present disclosure.

FIG. 8 illustrates an example of a device registration detailed setting screen 800. FIG. 9 illustrates an example of a relationship of information pieces registered in the central management apparatus 111.

The device registration detailed setting screen 800 is used for setting a default value of information of the network device to be registered in the central management apparatus 111. The device registration detailed setting screen 800 is displayed on the display 207 of the monitoring apparatus 101. The device registration detailed setting screen 800 is displayed at an arbitrary timing. According to the present exemplary embodiment, the processing for displaying the device registration detailed setting screen 800 is executed in step S723 in FIG. 7. For example, the device registration detailed setting screen 800 can be displayed at a timing when the processing in step S723 is first executed.

The default value of the network device information is registered for each environment setting of the system or each network device using the device registration detailed setting screen 800. By using of the device registration detailed setting screen 800, the registration information can be complemented which cannot be obtained from the device information transmitted from the network device and is necessary for registration in the central management apparatus 111.

On the device registration detailed setting screen 800 illustrated in FIG. 8, a setting for determining the monitoring mode of the network device and a setting of the registration information which may differ in each registration of the network device can be performed. The setting for determining the monitoring mode of the network device is performed from a check box 801. When the check box 801 is checked, the monitoring mode of the network device of which the monitoring function is enabled is regarded as the first connection mode. On the other hand, when the check box 801 is not checked, the monitoring mode of the network device of which the monitoring function is enabled is regarded as the second connection mode.

Further, on the device registration detailed setting screen 800 illustrated in FIG. 8, a client identification (ID), a client name, a contract No., an administrator name, and an inventory storage location name can be set as examples of information pieces which may differ in each registration of the network device. When an "obtain information" button 802 is pressed, the monitoring control unit 405 obtains, from the central management apparatus 111, information registered in the central management apparatus 111 in association with the monitoring apparatus 101 and changes the contents on the device registration detailed setting screen 800 based on the obtained information. The contents on the device registration detailed setting screen 800 can be directly edited based on an operation by a user.

In FIG. 9, client information 901, contract information 902, and monitoring apparatus information 903 are respectively associated with the contract information 902, the monitoring apparatus information 903, and device information 904. Administrator information 905 and inventory storage location information 906 are associated with the device information 904. The client ID and the client name illustrated in FIG. 8 are parts of the client information 901. Similarly, the contract No. is a part of the contract information 902, the administrator name is a part of the administrator information 905, and the inventory storage location name is a part of the inventory storage location information 906. The monitoring apparatus information 903 is an ID of the monitoring apparatus 101.

When the "obtain information" button 802 is pressed, the monitoring control unit 405 obtains, from the central management apparatus ill, the monitoring apparatus information 903, the contract information 902, and the client information 901 of itself using the ID of the monitoring apparatus 101 as a key. Further, the monitoring control unit 405 obtains the administrator information 905 and the inventory storage location information 906 associated with the device information 904 of the network device managed by itself. The monitoring control unit 405 uses thus obtained information pieces and updates the device registration detailed setting screen 800 illustrated in FIG. 8. The client information 901 and the other information pieces 902 to 906 can be in a one-to-many relationship. On the device registration detailed setting screen 800 in FIG. 8, an example is illustrated in which the client information 901 (the client ID) and the contract No., the administrator name, and the inventory storage location name are in the one-to-many relationship. Therefore, in FIG. 8, the contract No., the administrator name, and the inventory storage location name can be selected from a plurality of candidates by drop-down lists.

When input to the device registration detailed setting screen 800 is completed, and an OK button 803 is pressed, the monitoring control unit 405 stores the content input to the device registration detailed setting screen 800 as the default value of the information of the network device to be registered in the central management apparatus 111.

Next, the processing in the flowchart in FIG. 7 is described. The processing in the flowchart in FIG. 7 is executed, for example, when operations of the system illustrated in FIG. 1 are started.

First, in step S701, the monitoring control unit 405 performs initialization processing of the system according to a start of a program. More specifically, the monitoring control unit 405 reads initialization data necessary for the initialization of the system from the database 104, a setting file, and the like and performs the initialization processing of the system on each operation unit based on the initialization data. The device information management unit 406 performs processing for reading an information table regarding the network devices as the monitoring targets of itself from the database 104 via the database access unit 404 as a monitoring device list and other processing. The monitoring control unit 405 instructs the network devices included in the monitoring device list to perform the initialization processing for device monitoring and starts monitoring of the network devices. At this time, the monitoring control unit 405 also executes, for example, event registration in the network device and other processing.

Next, in step S702, the monitoring control unit 405 determines whether a device search request is detected. The device search request is a request to search the network device. The device search request is generated by an operation on the keyboard 206, an operation (menu selection) to a graphical user interface (GUI) of the present device management program, and the like. The device search request is also executed by an instruction from the central management apparatus 111. The monitoring control unit 405 obtains an operation instruction at regular intervals from the central management apparatus 111 and obtains various requests as the operation instructions.

When the device search request is detected (YES in step S702), in step S703, the monitoring control unit 405 displays a search condition input screen using the UI unit 408. Search conditions include at least a specification of a search protocol and a specification of a search range such as an Internet protocol (IP) address, a host name, and sub-net corresponding to each protocol.

Next, in step S704, the monitoring control unit 405 determines whether an input to the search condition input screen is completed. For example, when a predetermined button displayed on the search condition input screen (the GUI) is pressed and the like, the monitoring control unit 405 determines that the input to the search condition input screen is completed.

When the device search conditions are instructed from the central management apparatus 111 or a search of the network device is executed according to the device search conditions set to the system in advance, the search condition input screen is not displayed.

The processing is waited until the input to the search condition input screen is completed. When the input to the search condition input screen is completed (YES in step S704), in step S705, the monitoring control unit 405 executes the search of the network device according to the device search conditions specified on the search condition input screen. The network devices as search targets are both of the network device of which the monitoring function is enabled and the network device monitored by the monitoring apparatus. Whether the network device is searched or not can be determined, for example, by whether basic device information of the relevant network device is obtained. The relevant device information includes, for example, a MAC address and model information. Then, the processing returns to the above-described step S702.

In step S702, when the device search request is not detected (NO in step S702), in step S706, the monitoring control unit 405 determines whether a device search result display request is detected. The device search result display request is generated by an operation on the keyboard 206, an operation (menu selection) to a UI of the present device management program, and the like. However, instead of the processing in step S706, the processing may be waited for completion of the search of the network device (in step S705), and when the search is completed, the search result may be automatically displayed. In this case, the processing in step S706 is not performed, and the processing in step S707 and subsequent steps are performed next to the processing in step S705.

When the device search result display request is detected as a result of the determination in step S706 (YES in step S706), in step S707, the monitoring control unit 405 displays a device search result screen using the UI unit 408. The device search result is a result of the device search processing executed in step S705. The device search result screen displays a list of information pieces which can specify the network device such as a model name, the serial No., the MAC address, and the IP address of the network device searched by the device search processing. When the device search processing in step S705 is not executed or when the network device is not detected as a result of the device search processing executed in step S705, the monitoring control unit 405 displays a message of that fact on the device search result screen using the UI unit 408. Then, the processing returns to the above-described step S702.

FIG. 10 illustrates an example of a device search result screen 1000.

The device information including the information which can specify the searched network device is displayed on the device search result screen 1000. In FIG. 10, an example is illustrated in which a search execution date and time and the serial No., the product name, the IPv4 address, a registration state in the central management apparatus 111, and the device state of the searched network device are displayed as the device information. A user selects a check box in a selection column 1001 and presses a "register" button 1002. The network device checked in the check box of the selection column 1001 is a candidate of the network device to be registered in the central management apparatus 111 by the processing in step S722 described below. When the network devices in the selection columns 1001 are selected, a "select all" button 1003 is pressed. When the device search result screen 1000 is closed, a "close" button 1004 is pressed.

In step S706, when the device search result display request is not detected (NO in step S706), in step S708, the monitoring control unit 405 determines whether a monitoring device list display request is detected. The monitoring device list display request is generated by an operation on the keyboard 206, an operation (menu selection) to the UI of the present device management program, and the like. When the monitoring device list display request is detected as a result of the determination (YES in step S708), the monitoring control unit 405 performs third display processing. For example, in step S709, the monitoring control unit 405 displays a monitoring device list screen using the UI unit 408. Then, the processing returns to the above-described step S702.

On the monitoring device list screen, a list of the network devices stored in the database 104 is displayed. When the number of the network devices is large, the list of the network devices can be displayed on a plurality of pages. The database 104 stores both of the network device monitored in the first connection mode and the network device monitored in the second connection mode. Therefore, the list of both of the network devices in the first connection mode and in the second connection mode can be displayed to a user without accessing to the central management apparatus 111.

In step S708, when the monitoring device list display request is not detected (NO in step S708), in step S710, the monitoring control unit 405 determines whether a device detail screen display request is detected. The device detail screen display request is generated by an operation on the keyboard 206, an operation (menu selection) to the UI of the present device management program, and the like. When the device detail screen display request is detected as a result of the determination (YES in step S710), in step S711, the monitoring control unit 405 displays a device detailed information screen using the UI unit 408. In this regard, a particular network device is specified from the monitoring device list screen displayed in step S709, and the device detailed information screen may be displayed for the specified network device.

FIG. 11 illustrates an example of a device detailed information screen 1100.

On the device detailed information screen 1100, information obtained from the network device is displayed as information used for uniquely determining the relevant network device to be registered in the central management apparatus 111. In FIG. 11, an example is illustrated in which the serial No., the product name, the IPv4 address, the MAC address, and the device state of the network device are displayed as the relevant information pieces. In addition to these information pieces, the registration state as the monitoring target, the monitoring form, and a communication state with the central management apparatus are displayed in FIG. 11. When the screen is initialized, the device detailed information screen 1100 is constituted using the device information pieces stored in the database 104. In step S712, the information pieces are updated when an "information update" button 1101 is pressed. When the screen is initialized, information pieces displayed on the device detailed information screen 1100 may be obtained from the network device and the central management apparatus 111.

The monitoring control unit 405 displays the registration state in the device detailed information screen 1100 as "registered" when the device registration processing in step S713 with respect to the network device is all normally completed. When the device registration processing in step S722, which is described below, to the network device is not completed due to disconnection of power supply to the network device and the like, the registration state in the device detailed information screen 1100 is displayed as "during registration". Further, when the device registration processing in step S722 described below is ended by an error, the registration state in the device detailed information screen 1100 is displayed as "* error". "*" represents characters specifying a content of the error. Accordingly, the content of the error can be understood.

The monitoring control unit 405 displays either of the first connection mode or the second connection mode as the monitoring mode of the device detailed information screen 1100. As described above, the first connection mode is a first mode that the network device of which the monitoring function is enabled directly communicates with the central management apparatus 111. The second connection mode is a second mode that the monitoring apparatus 101 communicates with the central management apparatus 111 on behalf of the network device monitored by the monitoring apparatus 101.

In the example illustrated in FIG. 11, contents of the latest three communications with the central management apparatus 111 are displayed as the communication states with the central management apparatus. However, the number of displays can be changed. In the example illustrated in FIG. 11, the contents of only two communications are displayed since a state immediately after the start of monitoring is assumed.

After displaying the device detailed information screen 1100 in step S711, in step S712, the monitoring control unit 405 determines whether the "information update" button 1101 is pressed. When the "information update" button 1101 is pressed (YES in step S712), in step S713, the monitoring control unit 405 obtains information necessary to be displayed on the device detailed information screen 1100 as update information. In the information pieces displayed on the device detailed information screen 1100, the information necessary to be obtained from the network device is obtained from the network device, and the information necessary to be obtained from the central management apparatus 111 is obtained from the central management apparatus 111. Further, the information necessary to be obtained from the database 104 is obtained from the database 104 via the database access unit 404.

In the example illustrated in FIG. 11, the information pieces obtained from the network device are the serial No., the product name, and the MAC address. These information pieces can be obtained by the processing in step S705. The information pieces obtained from the database 104 are the IPv4 address, the registration state, and the monitoring mode. These information pieces can be obtained by the processing in step S722 described below. Only when the monitoring mode of the network device is the first connection mode, the information indicating that fact is obtained from the central management apparatus 111. When the monitoring mode of the network device is the second connection mode, the monitoring apparatus 101 itself transmits the monitoring information of the network device, and thus the information indicating that fact is obtained from the database 104. The communication state with the central management apparatus is obtained from a result of communication between the monitoring apparatus 101 and the central management apparatus 111 or communication between the network device and the central management apparatus 111 (for example, steps S1305, S1313, S1315, and S1319 in FIG. 13 described below).

In step S714, the monitoring control unit 405 updates the device detailed information screen 1100 with the update information pieces obtained in step S713. In the case that these information pieces cannot be obtained when the "information update" button 1101 is pressed, a column for displaying the relevant information in the device detailed information screen 1100 may be displayed, for example, in blank, in a state of when the screen is initialized, or in a state before the update. Then, the processing returns to the above-described step S702.

In step S712, when the "information update" button 1101 is not pressed (NO in step S712), in step S715, the monitoring control unit 405 determines whether a "close" button 1102 is pressed. When the "close" button 1102 is pressed as a result of the determination (YES in step S715), in step S716, the monitoring control unit 405 closes the device detailed information screen 1100. Then, the processing returns to the above-described step S702. On the other hand, when the "close" button 1102 is not pressed (NO in step S715), the monitoring control unit 405 waits until the "information update" button 1101 or the "close" button 1102 is pressed.

In step S710, when the device detail screen display request is not detected (NO in step S710), in step S717, the monitoring control unit 405 determines whether a device registration request is detected. The device registration request is a request to register the network device in the central management apparatus 111. The device registration request is generated by an operation on the keyboard 206, an operation (menu selection) to the UI of the present device management program, and the like.

When the device registration request is detected (YES in step S717), in step S718, the monitoring control unit 405 displays a registration device designation screen using the UI unit 408. The registration device designation screen is a screen for specifying the network device to be registered in the central management apparatus 111 and the information of the relevant network device. The registration device designation screen is a screen on which the IP address, the host name, and the like that the monitoring apparatus 101 can reach can be specified. When a plurality of communication protocols is supported as the communication protocols used for the search of the network device, the registration device designation screen may be constituted to be able to specify the communication protocol used for the search of the network device from among the plurality of communication protocols. Further, the registration device designation screen may be constituted to be able to select a network device registered in the central management apparatus 111 from among the list of the network devices searched in step S705. The registration device designation screen can be realized by a configuration, for example, similar to that of the device search result screen illustrated in FIG. 10. However, in the registration device designation screen, the information of the search execution date and time illustrated in FIG. 10 is not necessary.

Next, in step S719, the monitoring control unit 405 determines whether a specification of the network device is completed on the registration device designation screen. For example, when the "registration" button is pressed on the registration device designation screen, the monitoring control unit 405 determines that the specification of the network device is completed on the registration device designation screen.

As with the device search request, the device registration request can be executed by an instruction from the central management apparatus 111 and the like. In this case, the network device to be registered in the central management apparatus 111 is instructed by the central management apparatus 111, and the device registration processing (in step S722) described below is executed without displaying the registration device designation screen.

The processing is waited until the specification of the network device is completed on the registration device designation screen. When the specification of the network device is completed on the registration device designation screen (YES in step S719), the monitoring control unit 405 performs first display processing and second display processing. For example, in step S720, the monitoring control unit 405 displays a registration confirmation screen using the UI unit 408. FIG. 12 illustrates an example of a registration confirmation screen 1200. On the registration confirmation screen 1200, the registration information of the network device to be registered in the central management apparatus 111 is displayed in a central management apparatus registration information column 1201. When input is performed on the device registration detailed setting screen 800 illustrated in FIG. 8, the input content (the default value of the information of the network device registered in the central management apparatus 111) is displayed on the central management apparatus registration information column 1201. When input is not performed on the device registration detailed setting screen 800 illustrated in FIG. 8, each input column in the central management apparatus registration information column 1201 is, for example, left blank.

When an "obtain information" button 1203 is pressed, the monitoring control unit 405 obtains information registered in the central management apparatus 111 in association with the monitoring apparatus 101 from the central management apparatus 111 and changes the contents in the central management apparatus registration information column 1201 based on the obtained registration information. The processing is the same as when the "obtain information" button 802 on the device registration detailed setting screen 800 is pressed.

The configuration of the central management apparatus registration information column 1201 is the same as that of the device registration detailed setting screen 800. More specifically, a check box 1202 is displayed on the central management apparatus registration information column 1201. When the monitoring mode of the network device (of which the monitoring function is enabled) is registered as the first connection mode, a user checks the check box 1202. On the other hand, when the monitoring mode of the network device (of which the monitoring function is enabled) is registered as the second connection mode, a user does not check the check box 1202. As described above, the first connection mode is a mode that the network device of which the monitoring function is enabled directly communicates with the central management apparatus 111. The second connection mode is the second mode that the monitoring apparatus 101 communicates with the central management apparatus 111 on behalf of the network device monitored by the monitoring apparatus 101.

In the registration of the network device, the information which cannot be obtained from the information transmitted from the network device and is necessary for registration is complemented as illustrated in FIG. 12. In the example illustrated in FIG. 12, the registration information which may differ in each registration of the network device can be set. In the example illustrated in FIG. 12, the client ID, the client name, the contract No., the administrator name, and the inventory storage location name can be set as the registration information. The above-described contents are the same as those in the device registration detailed setting screen 800 illustrated in FIG. 8.

In a registration device column 1204, information of the network device searched by the processing in step S705 is displayed. When the registration information of each network device is changed, a user checks a check box of a selection column 1205 of the network device to be changed and presses a "change registration information" button 1206. Accordingly, the monitoring control unit 405 displays a device registration detailed setting screen regarding the selected network device using the UI unit 408. The device registration detailed setting screen may be constituted similarly to the device registration detailed setting screen 800 illustrated in FIG. 8.

When the central management apparatus registration information column 1201 in FIG. 12 is directly edited, of the network device information pieces displayed on the registration device column 1204 can be changed.

When registration of a part of the network devices in the central management apparatus 111 is cancelled, a user checks the check box of the selection column 1205 and presses a "delete device" button 1206. By this processing, the network device checked in the check box of the selection column 1205 is excluded from the registration target.

In step S721, the monitoring control unit 405 determines whether execution of the registration of the network device in the central management apparatus 111 is instructed on the registration confirmation screen 1200. More specifically, when a "registration" button 1208 is pressed, the monitoring control unit 405 determines that execution of the registration of the network device in the central management apparatus 111 is instructed (YES in step S721). On the other hand, when a "cancel" button 1209 is pressed, the monitoring control unit 405 determines that execution of the registration of the network device in the central management apparatus 111 is cancelled (NO in step S721). When execution of the registration of the network device in the central management apparatus 111 is cancelled, the processing returns to the above-described step S702.

On the other hand, when execution of the registration of the network device in the central management apparatus 111 is instructed (YES in step S721), in step S722, the device registration processing is executed, and then the processing returns to the above-described step S702. The device registration processing is described in detail below with reference to FIG. 13.

In step S717, when the device registration request is not detected (NO in step S717), in step S723, the monitoring control unit 405 performs other processing, and then the processing returns to the above-described step S702. The other processing includes processing for closing the screen displayed by the processing in steps S703, S707, S719, and S729. As described above, display of the device registration detailed setting screen 800 illustrated in FIG. 8 and the processing based on the operations performed on the device registration detailed setting screen 800 are included in the other processing.

Figure 13:
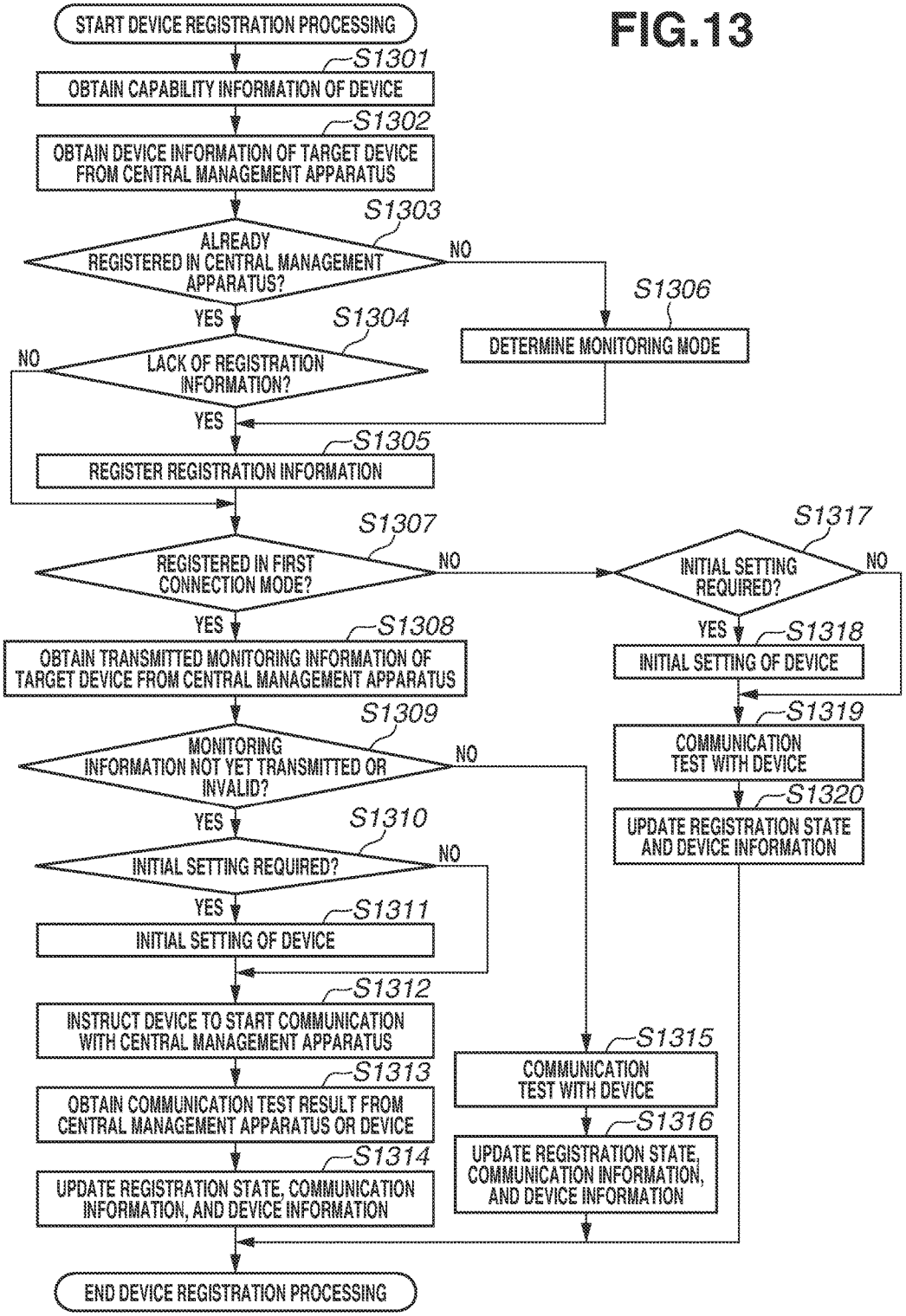
FIG. 13 is a flowchart illustrating device registration processing in detail according to one or more aspects of the present disclosure.

FIG. 13 is a flowchart illustrating an example of details of the device registration processing of the monitoring apparatus 101. Processing in the flowchart in FIG. 13 is that in step S722 in FIG. 7.

First, the monitoring control unit 405 performs first obtainment processing. For example, in step S1301, the monitoring control unit 405 obtains the capability information of the network device instructed to be registered in the central management apparatus 111 from the relevant network device. An available communication protocol such as a Simple Network Management Protocol (SNMP) and Web Service is different according to the network device. Thus, when the capability information of the network device is obtained from the relevant network device, the monitoring control unit 405 also confirms whether to have an interface communicable with the relevant network device.

According to the present exemplary embodiment, the device information obtainment unit 407 obtains information indicating whether the relevant network device can be monitored in the first connection mode as the capability information of the network device. Further, the device information obtainment unit 407 obtains basic device information of the network device not subjected to the device search processing in step S705 as the capability information of the relevant network device. The relevant device information includes, for example, the MAC address and the model information.

Next, the device information obtainment unit 407 performs second obtainment processing. For example, in step S1302, the device information obtainment unit 407 obtains the device information of the network device as the registration target from the central management apparatus 111. For example, the device information obtainment unit 407 makes a request to the central management apparatus 111 for obtaining the device information of the network device already registered in the central management apparatus 111 using the serial No. and the like for identifying the network device as a key.

Next, the monitoring control unit 405 performs first determination processing. For example, in step S1303, the monitoring control unit 405 determines whether the network device as the registration target is already registered in the central management apparatus 111 from the device information obtained in step S1302. The determination can be performed by, for example, whether the device information of the network device as the registration target can be obtained from the central management apparatus 111. As a result of the determination, when the network device as the registration target is already registered in the central management apparatus 111 (YES in step S1303), in step S1304, the monitoring control unit 405 determines whether the registration information of the network device registered in the central management apparatus 111 is insufficient. An item of the registration information assumed to be insufficient includes, for example, an arbitrary setting item not required to be set when registered in the central management apparatus 111. More specifically, information pieces such as the MAC address and detail device information which requires time and effort of a registrant in manual input correspond to the items of the registration information assumed to be insufficient.

When the registration information of the network device registered in the central management apparatus 111 is insufficient (YES in step S1304), the monitoring control unit 405 performs first instruction processing. For example, in step S1305, the monitoring control unit 405 instructs the central management apparatus 111 to update the registration information of the network device registered in the central management apparatus 111. The central management apparatus 111 updates the registration information of the network device based on the capability information of the network device obtained in step S1301 and the basic device information of the network device obtained in step S705.

In step S1303, when the network device as the registration target is not registered in the central management apparatus 111 (NO in step S1303), the monitoring control unit 405 performs determination processing. For example, in step S1306, the monitoring control unit 405 determines the first connection mode and the second connection mode as the monitoring mode of the relevant network device. For the determination, for example, the monitoring control unit 405 confirms whether the relevant network device is the network device of which the monitoring function is enabled based on the capability information of the network device obtained in step S1301. When the relevant network device is not the network device of which the monitoring function is enabled, the monitoring control unit 405 sets the monitoring mode of the relevant network device to the second connection mode.

On the other hand, when the relevant network device is the network device of which the monitoring function is enabled, the monitoring control unit 405 sets either of the first connection mode or the second connection mode according to the monitoring mode of the relevant network device set by a user. According to the present exemplary embodiment, when "The device is preferentially registered in the first connection mode" is checked on the registration confirmation screen 1200 illustrated in FIG. 12, the monitoring mode of the network device of which the monitoring function is enabled is determined as the first connection mode. On the other hand, when the check box 1202 is not checked, the monitoring mode of the network device is determined as the second connection mode even in the case of the network device of which the monitoring function is enabled.

In step S1306, when the monitoring mode of the network device as the registration target is determined, the processing proceeds to the above-described step S1305, and the monitoring control unit 405 performs the first instruction processing. For example, in step S1305, the monitoring control unit 405 instructs the central management apparatus 111 to register registration information of an unregistered network device. The central management apparatus 111 registers the registration information of the network device based on the capability information of the network device obtained in step S1301, the input to the check box 1202, and the basic device information of the network device obtained in step S705.

When the processing in step S1305 is completed as described above, the monitoring control unit 405 performs third determination processing. For example, in step S1307, the monitoring control unit 405 determines whether to register the network device as the registration target in the first connection mode. Regarding the network device already registered in the central management apparatus 111, the determination is performed by assuming that the monitoring mode is the one when registered. On the other hand, regarding the network device not yet registered in the central management apparatus 111, the determination is performed according to the determination in step S1306.

As a result of the determination, when the network device as the registration target is registered in the first connection mode (YES in step S1307), in step S1308, the monitoring control unit 405 obtains the monitoring information already transmitted by the network device as the registration target from the central management apparatus 111. In step S1309, the monitoring control unit 405 determines whether the monitoring information of the network device as the registration target is not yet transmitted or invalid. For example, when there is no monitoring information already transmitted by the network device as the registration target, it can be determined that the monitoring information of the network device as the registration target is not yet transmitted. Further, for example, when a date of the obtained monitoring information is older than a predetermined period, or a communication result is abnormal, it can be determined that the monitoring information is invalid data. A criterion thereof may be variably set in a setting file and the like.

When the monitoring information of the network device as the registration target is not yet transmitted or invalid (YES in step S1309), the monitoring control unit 405 performs second determination processing. In other words, in step S1310, the monitoring control unit 405 determines whether the relevant network device requires an initial setting to start communication with the central management apparatus 111. The determination is performed based on the capability information of the relevant network device obtained in step S1301. As a result of the determination, when the network device as the registration target requires the initial setting (YES in step S1310), the monitoring control unit 405 performs third instruction processing. For example, in step S1311, the monitoring control unit 405 instructs the relevant network device to perform the initial setting. Then, the processing proceeds to step S1312. The initial setting includes, for example, the network setting of the proxy server 106 and the like. The initial setting may be performed by an instruction from the monitoring apparatus 101 or based on an operation instruction from the central management apparatus 111. On the other hand, when the relevant network device does not require the initial setting (NO in step S1310), the processing proceeds to step S1312 by skipping step S1311.

Next, the monitoring control unit 405 performs second instruction processing. For example, in step S1312, the monitoring control unit 405 instructs the network device as the registration target to start communication with the central management apparatus 111. With this instruction as a trigger, the network device as the registration target starts communication with the central management apparatus 111. More specifically, the network device as the registration target performs a communication test with the central management apparatus 111, obtainment of the communication schedule from the central management apparatus 111, and the like. After a time length sufficient to perform such processing has elapsed, in step S1313, the monitoring control unit 405 obtains a communication test result from the central management apparatus 111 or the network device as the registration target. Whether to obtain the communication test result from the central management apparatus 111 or the network device as the registration target is determined based on the capability information of the relevant network device obtained in step S1301. When the communication test result of the network device as the registration target can be obtained from the relevant network device, the communication result is obtained from the relevant network device, and otherwise, the communication test result of the relevant network device is obtained from the central management apparatus 111. From the communication test result obtained in step S1313, it can be determined whether the central management apparatus 111 and the network device can normally communicate with each other.

Then, the monitoring control unit 405 performs update processing. In other words, in step S1314, the monitoring control unit 405 updates the device information, the registration state, and the communication information of the network device as the registration target in the database 104 based on the communication test result obtained in step S1313. The device detailed information screen 1100 in FIG. 11 is an example of the device detailed information screen immediately after when the communication test is successful. Accordingly, the processing in the flowchart in FIG. 13 is terminated, and the processing returns to the flowchart in FIG. 7.

When the monitoring information of the network device as the registration target is transmitted or valid (NO in step S1309), it can be determined that the relevant network device has already started monitoring based on the enabled monitoring function of itself. Thus, in step S1315, the monitoring control unit 405 performs the communication test with the relevant network device. Whether the monitoring apparatus 101 and the network device can normally communicate with each other can be determined by the result of the communication test performed in step S1315. In step S1316, the monitoring control unit 405 updates the device information, the registration state, and the communication information of the relevant network device in the database 104 based on the result of the communication test performed in step S1315. Accordingly, the processing in the flowchart in FIG. 13 is terminated, and the processing returns to the flowchart in FIG. 7.

In step S1307, when the network device as the registration target is not registered in the first connection mode (NO in step S1307), the relevant network device becomes the monitoring target of the monitoring apparatus 101 itself. In step S1317, the monitoring control unit 405 determines whether the relevant network device requires the initial setting. The determination is performed based on the capability information of the relevant network device obtained in step S1301.

As a result of the determination, when the network device as the registration target requires the initial setting (YES in step S1317), in step S1318, the monitoring control unit 405 performs the initial setting of the relevant network device. More specifically, for example, when the network device is determined to be monitored in the second connection mode even the network device has the monitoring function, the relevant network device may already transmit the monitoring data to the central management apparatus in the first connection mode in some cases. In such a case, in step S1318, the monitoring control unit 405 performs fourth instruction processing in order to avoid redundant monitoring. For example, the monitoring control unit 405 instructs the relevant network device to stop monitoring in the first connection mode. Then, the processing proceeds to step S1319. On the other hand, when the relevant network device does not require the initial setting (NO in step S1317), the processing proceeds to step S1319 by skipping step S1318.

Then, the monitoring control unit 405 performs communication processing. In other words, in step S1319, the monitoring control unit 405 performs the communication test with the relevant network device. Whether the monitoring apparatus 101 and the network device can normally communicate with each other can be determined by the result of the communication test performed in step S1319. Next, the monitoring control unit 405 performs the update processing. In other words, in step S1320, the monitoring control unit 405 updates the device information and the registration state of the relevant network device in the database 104 based on the result of the communication test performed in step S1319. Accordingly, the processing in the flowchart in FIG. 13 is terminated, and the processing returns to the flowchart in FIG. 7.

As described above, according to the present exemplary embodiment, the monitoring mode of the network device which is not registered in the central management apparatus 111 is determined based on the capability information thereof, and the relevant network device is registered in the central management apparatus 111. When the monitoring information is not yet transmitted from the network device of which the monitoring function is enabled to the central management apparatus 111 or invalid, the central management apparatus 111 is requested to start communication with the relevant network device. Further, the registration state, the communication information, and the device information of the relevant network device managed by the monitoring apparatus 101 are updated based on the communication result. Therefore, when the network device is registered at a start of operations in a client environment in which the network device of which the monitoring function is enabled and the network device monitored by the monitoring apparatus are mixed, a user can suppress to confirm capability of each network device. In addition, registration in the central management apparatus 111 is automatically performed, and thus an error or omission in the registration in the central management apparatus 111 can be suppressed.

Further, according to the present exemplary embodiment, when the network device having the monitoring function is monitored in the second connection mode, the relevant network device is instructed to stop monitoring in the first connection mode. Therefore, the network device having the monitoring function can be suppressed from being redundantly monitored in the first connection mode and the second connection mode, and the monitoring can be appropriately performed.

Further, according to the present exemplary embodiment, the monitoring apparatus 101 instructs the initial setting of the network device which requires the initial setting (the initialization processing) to start communication with the central management apparatus 111. Therefore, there is no need to perform the initial setting on each of the network devices, and time and effort on operations can be reduced.

As described above, according to the present exemplary embodiment, the initial installation (including the initial setting) of the network device can be efficiently performed at the start of operations in the client environment in which the network device of which the monitoring function is enabled and the network device monitored by the monitoring apparatus are mixed.

Next, a second exemplary embodiment is described according to one or more aspects of the present disclosure. According to the first exemplary embodiment, an environment is assumed in which the network device of which the monitoring function is enabled and the network device monitored by the monitoring apparatus are mixed. The present exemplary embodiment enables monitoring in either of the first connection mode or the second connection mode by a registration instruction to the monitoring apparatus 101 in such an environment. Accordingly, the network device of which the monitoring function is enabled can perform monitoring in the first connection mode. In addition, the central management apparatus 111 can confirm a monitoring state (the communication state) of the network device of which the monitoring function is enabled (see FIG. 11).

However, the first exemplary embodiment can display the monitoring state (the communication state) of the network device of which the monitoring function is enabled. Thus, according to the present exemplary embodiment, the monitoring state of the network device of which the monitoring function is enabled in the central management apparatus 111 is regularly monitored so as to be able to respond to an abnormality in the monitoring state. As described above, according to the present exemplary embodiment, the monitoring apparatus 101 regularly obtains the monitoring state (the communication state) of the network device of which the monitoring function is enabled and performs processing corresponding to the obtained monitoring state (the communication state) in addition to the first exemplary embodiment. Therefore, in the description of the present exemplary embodiment, portions same as those in the first exemplary embodiment are denoted by the same reference numerals used in FIGS. 1 to 13, and the detailed descriptions thereof are omitted.

First, the monitoring control unit 405 obtains the communication information of the network device of which the monitoring function is enabled from the central management apparatus 111. In this regard, the monitoring control unit 405 determines whether the monitoring information is normally transmitted or not every time the communication information is obtained. For example, the monitoring control unit 405 determines whether the monitoring information is normally transmitted based on regular charging data and the transmission data of the log information. As a result of the determination, when the monitoring information is not normally transmitted, the monitoring control unit 405 regularly performs the communication test with the relevant network device. When the communication test is successful, the monitoring control unit 405 obtains information not yet obtained from the relevant network device. Further, the monitoring control unit 405 performs at least either one of processing for storing the obtained information in the database 104 and recording an operation log or processing for transmitting the information to the central management apparatus 111 by proxy. When the monitoring information is not normally transmitted from the relevant network device, in other words, the monitoring state of the relevant network device is abnormal, the monitoring control unit 405 displays information indicating the abnormality using the UI unit 408. Thus, a registered administrator can be notified of the abnormality in the monitoring state of the network device of which the monitoring function is enabled and respond quickly thereto. For example, the monitoring control unit 405 registers an email address of the administrator therein in advance and transmits a notification to the email address of the abnormality in the monitoring state of the network device of which the monitoring function is enabled. The abnormality in the monitoring state of the network device includes, for example, that communication is not normally performed in the relevant network device, and charging is not normally performed in the relevant network device.

When the monitoring apparatus 101 has a function of the proxy server 106, reception of information from the network device of which the monitoring function is enabled is passed through the central management apparatus 111, so that the monitoring apparatus 101 can grasp presence or absence of communication. In this case, the number of monitoring times of the communication state of the network device with the central management apparatus 111 can be reduced.

The monitoring apparatus 101 is configured as described above, and accordingly a response to an abnormality in the network device of which the monitoring function is enabled can be quickly performed, and an effect of reducing omission of monitoring of the relevant network device can be obtained in addition to the effect according to the first exemplary embodiment.

The exemplary embodiments described above are merely examples for implementing the present disclosure, so that the examples should not be construed restrictively limiting the technical scope of the present disclosure. In other words, the present disclosure can be implemented in the various forms without departing from the technical idea and/or the main features thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-044596, filed Mar. 8, 2016, which is hereby incorporated by reference herein in its entirety.

What is claimed is:

1. An information processing apparatus communicable with a management apparatus managing a network device, the information processing apparatus comprising:

a memory storing instructions; and a processor which can execute the instructions causing the information processing apparatus to:

obtain device information of a network device which is registered in the management apparatus;

obtain capability information of a network device communicably connected to the information processing apparatus, wherein the capability information includes information indicating whether or not an internal monitoring function in the network device is enabled;

determine whether a network device as a registration target is registered in the management apparatus based on the device information of the network device which is registered in the management apparatus;

determine, as a monitoring mode for monitoring a network device which is not registered in the management apparatus, either of a first mode for transmitting operation information from a network device to the management apparatus without passing through the information processing apparatus and a second mode for transmitting operation information from a network device to the management apparatus via the information processing apparatus based on the obtained capability information of the network device;

instruct information of a network device which is not registered in the management apparatus to be registered in the management apparatus as a network device monitored in the determined monitoring mode;

manage information of a network device monitored in the first mode;

in a case that operation information of the network device monitored in the first mode is not transmitted from the network device to the management apparatus, or information valid as the operation information of the network device monitored in the first mode is not transmitted to the management apparatus, request the management apparatus to start communication between the management apparatus and the network device monitored in the first mode; and update information of the network device managed by the information processing apparatus based on a result of the requested communication.

2. The information processing apparatus according to claim 1, wherein the instructions further cause the information processing apparatus to:
determine whether an initial setting is necessary to be performed on the network device monitored in the first mode for communicating with the management apparatus based on a capability of the network device;
instruct execution of the initial setting of the network device determined that the initial setting is necessary to be performed; and
wherein the network device determined that the initial setting is necessary is instructed to start communication with the management apparatus after executing the initial setting.

3. The information processing apparatus according to claim 1, wherein the instructions further cause the information processing apparatus to:
start communication of the information processing apparatus and a network device determined to be monitored in the second mode as the monitoring mode; and
update, based on a result of the communication of the network device determined to be monitored in the second mode, information managed regarding the network device.

4. The information processing apparatus according to claim 1, wherein the instructions further cause the information processing apparatus to:
display a screen for specifying either of the first mode and the second mode as the monitoring mode for the network device as the registration target; and
wherein, in a case that the monitoring mode for a network device which can be monitored in the first mode is determined, a mode specified using the screen is prioritized than a mode determined by the obtained capability information of the network device.

5. The information processing apparatus according to claim 1, wherein the instructions further cause the information processing apparatus to:
display information indicating a result of communication of the network device monitored in the first mode and the management apparatus in response to a request to start communication of the relevant network device and the management apparatus.

6. The information processing apparatus according to claim 1, wherein the instructions further cause the information processing apparatus to:
display a list of network devices monitored in the first mode and network devices monitored in the second mode.

7. The information processing apparatus according to claim 1, wherein the instructions further cause the information processing apparatus to:
instruct a network device which is a network device monitored in the second mode and can transmit, by using the internal monitoring function, operation information to the management apparatus without passing through the information processing apparatus to stop monitoring in the first mode.

8. A method executed in a system including a management apparatus managing a network device and an information processing apparatus, the method comprising:
obtaining device information of a network device 'which is registered in the management apparatus;
obtaining capability information of a network device communicably connected to the information processing apparatus, wherein the capability information includes information indicating whether or not an internal monitoring function in the network device is enabled;
determining whether a network device sis a registration target is registered in the management apparatus based on the device information of the network device which is registered in the management apparatus;
determining, as a monitoring mode for monitoring a network device which is not registered in the management apparatus, either of a first mode for transmitting operation information from a network device to the management apparatus without passing through the information processing apparatus and a second mode for transmitting operation information from a network device to the management apparatus via the information processing apparatus based on the obtained capability information of the relevant network device;
registering, in the management apparatus, information of the network device which is not registered in the management apparatus as a network device monitored in the determined monitoring mode;
in a case that operation information of a network device monitored in the first mode is not transmitted from the network device to the management apparatus, or information valid as the operation information of the network device monitored in the first mode is not transmitted to the management apparatus, starting communication of the network device and the management apparatus monitored in the first mode; and
updating information of the network device managed by the information processing apparatus based on a result of the communication.

* * * * *